Jan. 21, 1930.   D. G. CRUICKSHANK   1,744,364
HEADREST
Filed July 11, 1928    2 Sheets-Sheet 1
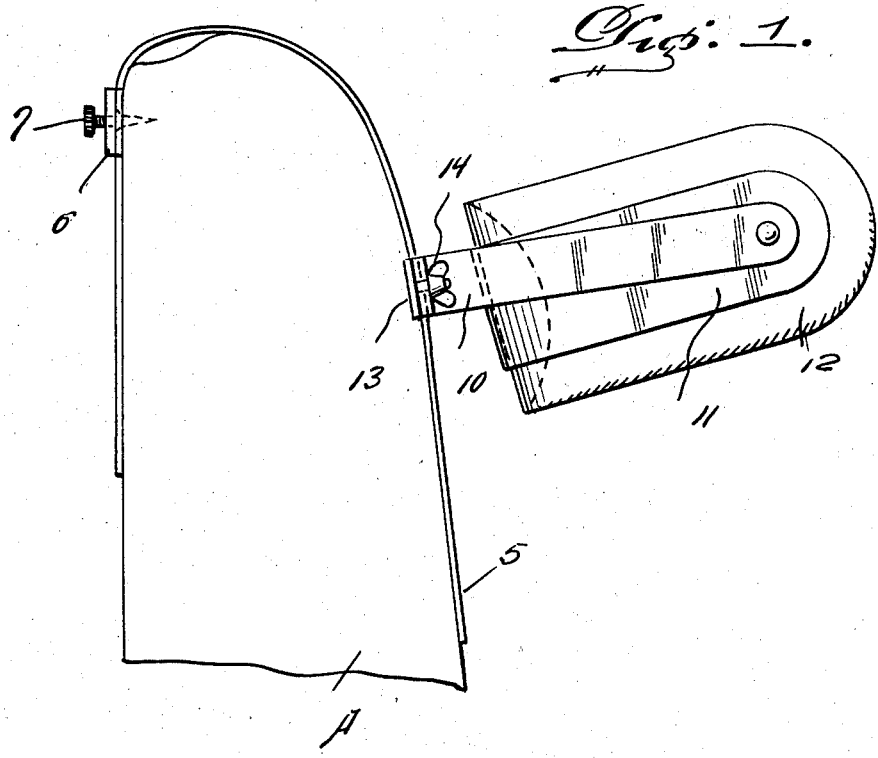
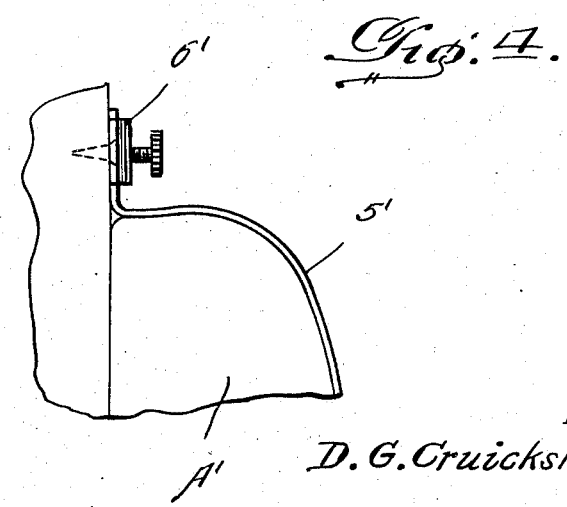
Inventor
D. G. Cruickshank,
By Clarence A. O'Brien
Attorney Jan. 21, 1930. D. G. CRUICKSHANK 1,744,364
HEADREST
Filed July 11, 1928 2 Sheets-Sheet 2

Inventor
D. G. Cruickshank,
By Clarence A. O'Brien
Attorney

Patented Jan. 21, 1930

1,744,364

UNITED STATES PATENT OFFICE

DAVID G. CRUICKSHANK, OF MONTCLAIR, NEW JERSEY

HEADREST

Application filed July 11, 1928. Serial No. 291,780.

This invention relates to new and useful improvements in head rests for automotive vehicles, railroad coaches, furniture, hospital beds and chairs and other similar uses, and aims to provide a novel, simple and inexpensive headrest construction that may be easily and inexpensively applied to the back rest of the seat, chair, bed, or other similar device, and that includes means for engagement round the back of the user's head for supporting the same in restful position, the rest per se being adjustable to meet varying conditions and persons of various heights. It is of course well known that on a long drive a motorist's head and neck will become greatly tired and my invention aims to provide means for overcoming this disadvantage in long driving. Traveler's in a railroad train likewise will find relief and where sleeping in a day coach, this invention will add to their comfort. This device also aims to afford a support to hospital patients as well as the sick in the home, or elsewhere, where it can be attached to a chair or bed. Similarly, readers can use the head rest on chairs to their comfort.

Furthermore, the device is of such a construction as to enable its ready attachment to the upper end of the seat of an automobile, railroad car, hospital seat, bed, etc., back rest and this without in any manner altering the construction of the said back rest and detracting to any great extent from the appearance of the part to which it is attached. An advantage of this device is that when not in use, it may be reduced to a compact parcel by releasing the thumb screw slightly and turning all metal frame work into a single plane and folding the cushion, thus greatly facilitating storage in a small space.

With the foregoing and other objects in view as the nature of the invention will be better understood, the same comprises the novel form, combination and arrangement of parts hereinafter more fully described, shown in the accompanying drawings and claimed.

In the accompanying drawings wherein like reference characters indicate corresponding parts throughout the same:

Figure 1 is a fragmentary end elevation of the back rest of an automobile drivers' seat with which is associated my improved device.

Figure 4 is a fragmentary elevation of the back rest of a seat within a coupe, roadster, or the like, disclosing a slightly modified support for the head rest per se.

Figure 2:
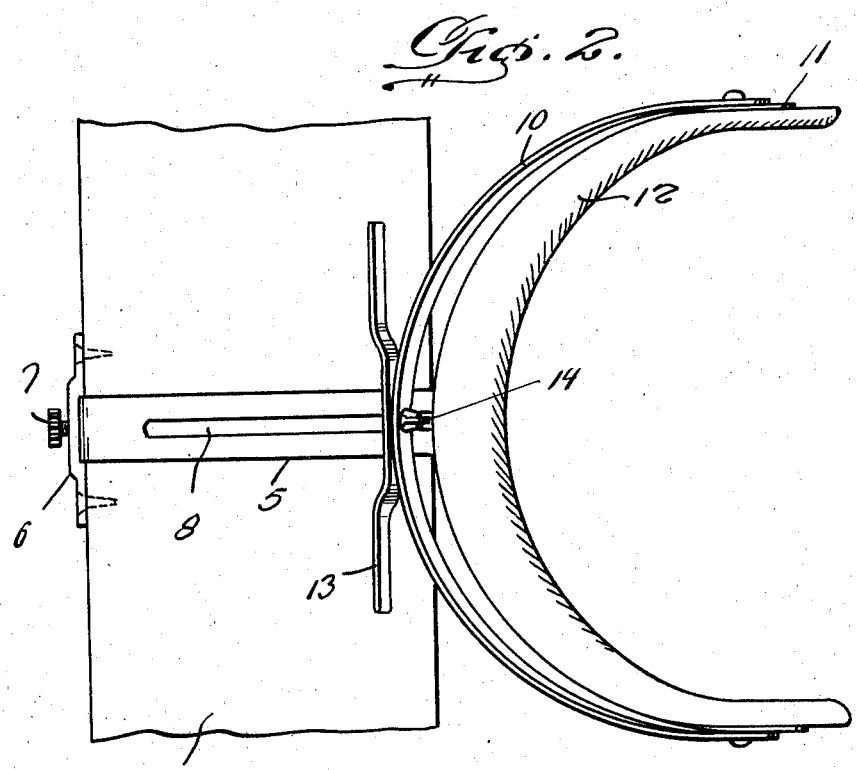
Figure 2 is a fragmentary top plan view of my back rest, the device being associated therewith.
Figure 3:
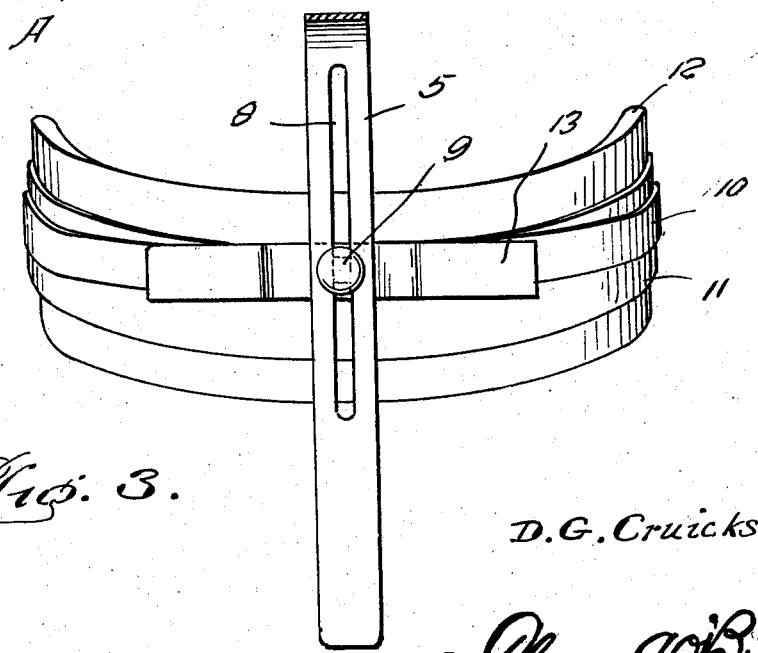
Figure 3 is a vertical sectional view through the seat back attaching unit looking toward the head rest per se.

Now having reference to Figures 1 to 3 inclusive, A designates the back rest of an automobile seat. My invention per se consists of an inverted generally U-shaped spring metal clamp 5 shaped to conform to the curvature of the upper end and front and back of the back rest A, a slide bracket 6 of suitable construction being secured to the rear surface of the back rest A adjacent its upper end and through which the rear leg of the clamp 5 is slidably disposed, this bracket being equipped with a set screw 7 whereby to secure the rear leg of the clamp therein to prevent movement of the clamp with respect to the back rest.

The upper portion and front leg of the clamp 5 is constructed with a longitudinal slot 8 of suitable length for slidably receiving the inner headed end of a bolt 9, this bolt having attached to its outer end a generally C-shaped frame 10 between the ends of the side legs of which is pivoted a generally C-shaped cushion frame 11, the inner face of which is equipped with a suitable head rest cushion 12. Between the frame 10 and the clamp 5 is a transversely extending brace strap 13, the ends of which are adapted for engagement with the seat back rest A to prevent side swinging of the frame 10 and the cushion carried thereby.

Threaded upon the inner threaded end of the said bolt is a wing nut 14 which when tightened up on the bolt will clamp the frame 10 as well as the strap 13 to the clamp 5 after the head rest structure has been properly adjusted.

In Figure 4 the seat back rest A' is disclosed as being against the back wall of the car body, and in this instance a suitable bracket 6' is secured to the back wall directly above the back rest and arranged therein is the upwardly bent upper end of a spring metal clamp 5' adapted to engage the upper edge and front surface of the back rest A', this clamp having a longitudinal slot therein and adapted for receiving a head rest structure similar in all respects to that illustrated in Figures 1, 2, and 3, and previously described.

It will thus be seen that I have provided a novel, simple and extremely serviceable head rest for seats of all characters and even though I have herein shown and described the invention as consisting of certain detail structural elements it is nevertheless to be understood that some changes may be made therein without affecting the spirit and scope of the appended claims.

Having thus described my invention, what I claim as new and desire to secure by Letters Patent is:—

1. In a head rest for seat backs, a member adapted to be associated with the back rest of a chair, a frame member vertically adjustably associated therewith, a head rest unit pivotally mounted within said frame in a manner and for the purpose described, and means associated with the frame at its point of attachment to the first mentioned member and adapted for engagement against the seat back rest at opposite sides of said first mentioned member to limit lateral movement of the frame.

2. In a head rest for seat backs, a substantially U-shaped resilient spring member adapted to be associated with and conform to the backrest of a chair, a substantially V-shaped frame member vertically adjustably associated therewith, a second frame member pivotally disposed within said first mentioned frame member and of a shape corresponding to said first mentioned frame member, the inner portion of said second frame, being spaced from the inner portion of said first frame, a cushion carried by said second frame member upon which the head of a person may rest, a transversely extending brace strap associated with said first mentioned frame, the opposite ends of said strap being adapted for rest upon the back rest at opposite sides of the said frame.

In testimony whereof I affix my signature.

DAVID G. CRUICKSHANK.